(12) United States Patent
Ueda et al.

(10) Patent No.: US 7,767,258 B2
(45) Date of Patent: Aug. 3, 2010

(54) POLYMER PARTICLE COMPOSITION AND PROCESS FOR PRODUCING THE SAME

(75) Inventors: Takashi Ueda, Takasago (JP); Yoshinori Takeda, Takasago (JP)

(73) Assignee: Kaneka Corporation, Osaka (JP)

( * ) Notice: Subject to any disclaimer, the term of this patent is extended or adjusted under 35 U.S.C. 154(b) by 1128 days.

(21) Appl. No.: 10/542,295

(22) PCT Filed: Feb. 6, 2004

(86) PCT No.: PCT/JP2004/001360

§ 371 (c)(1),
(2), (4) Date: May 2, 2006

(87) PCT Pub. No.: WO2004/076538

PCT Pub. Date: Sep. 10, 2004

(65) Prior Publication Data

US 2006/0246289 A1    Nov. 2, 2006

(30) Foreign Application Priority Data

Feb. 25, 2003 (JP) .............................. 2003-047803

(51) Int. Cl.
*B32B 5/16* (2006.01)
(52) U.S. Cl. .................... 427/212; 427/213.3; 427/222; 428/403; 428/407; 525/64
(58) Field of Classification Search ......... 428/403–407; 427/212, 213.3, 222; 525/64
See application file for complete search history.

(56) References Cited

U.S. PATENT DOCUMENTS

| 4,463,032 A | 7/1984 | Arndt et al. |
| 7,094,832 B2 * | 8/2006 | Ueda et al. .................. 525/64 |

FOREIGN PATENT DOCUMENTS

| EP | 510 805 A1 | 10/1992 |
| GB | 1087390 | * 7/1967 |
| GB | 1087390 | 10/1967 |
| JP | 2000-112174 | 4/2000 |
| WO | WO03/093353 | 11/2003 |

OTHER PUBLICATIONS

Patent Abstracts of Japan, JP 06-179754, Jun. 28, 1994, ICI Americas Inc.
European Patent Office; Supplemental Search Report dated Aug. 11, 2008 in European Application No. 04708913.1.

* cited by examiner

*Primary Examiner*—Leszek Kiliman
(74) *Attorney, Agent, or Firm*—Kenyon & Kenyon LLP

(57) ABSTRACT

The molding thermoplastic polymer, which can solve a problem with fine particles in a suspension polymerization process, a problem for a reduction in energy consumption at the time of drying in an emulsion polymerization process, and a problem in compounding procedures for processors. The invention relates to molding thermoplastic polymer particles comprising 100 parts by weight of suspension polymer particles having a glass transition temperature of 60° C. or more and an average particle diameter of 50 to 500 μm produced by suspension polymerization, the said suspension polymer particles being coated with 5 (inclusive) to 22 (exclusive) parts by weight of an emulsion polymer produced by emulsion polymerization.

16 Claims, 2 Drawing Sheets

Particle size distribution (a)

100μm (b)

100μm

POLYMER PARTICLE COMPOSITION AND PROCESS FOR PRODUCING THE SAME

This is a 371 national phase application of PCT/JP2004/001360 filled 6 Feb. 2004, claiming priority to Japanese Application No. 2003-047803 filed 25 Feb. 2003, the contents of which are incorporated herein by reference.

TECHNICAL FIELD

The present invention relates to molding thermoplastic polymer particles and a process for producing them. The present invention relates in particular to suspension-emulsion composite molding thermoplastic polymer particles in such a form that suspension polymer particles produced by suspension polymerization are coated with an emulsion polymer produced by emulsion polymerization, and a process for producing them. The polymer particles of the present invention are rigid molding thermoplastic polymer particles and can thus be used widely as rigid general-purpose thermoplastic resin or a quality improving additive thereof.

BACKGROUND ART

Suspension polymerization is used widely in industry as a process for producing rigid general-purpose thermoplastics such as vinyl chloride resin, styrene resin, acrylic resin and methacrylic resin. This is because polymerization heat can be easily controlled, and polymer particles can be recovered easily only by dehydration and drying.

However, when polymer particles are produced by suspension polymerization, the particle diameter usually shows broad distribution, and fine particle polymers having diameters deviated significantly from desired particle diameter are also simultaneously formed. As a result, there occur undesirable results such as extreme deterioration in filterability due to filter clogging caused by the fine powders in a dehydration step, entrainment of the fine powders in dehydration waste water, frequent troubles in the process due to clogging with the fine powders, deterioration in working atmosphere due to generation of powder dust, and an increase in danger of powder dust explosion.

The reason for generation of fine powder in suspension polymerization is that a monomer used in polymerization is water-soluble to some degree and is thus considerably emulsified upon initiation of suspension polymerization, or undergoes strong shear due to stirring so that monomer droplets are extremely over-dispersed. To solve these disadvantages, the type and amount of a dispersing agent added at the time of polymerization are selected for the former (see, for example, page 2, upper left column, line 12 to lower right column, line 2 in JP-A 49-88987), and for the latter, it has been examined to make the fluidized state uniform by improving a stirring blade. However, even if these techniques are simultaneously used, generation of fine particles is hardly completely suppressed in many cases, causing significant disadvantages to waste water disposal and the like by the producers.

Emulsion polymerization is used widely as a process for producing an impact-strength improver for rigid plastics such as vinyl chloride resin, styrene resin, acrylonitrile-styrene resin, polycarbonate resin and polyether resin. This is because it is considered that when graft copolymer resin after granulation and recovery is to be melted and blended with rigid plastics, the graft copolymer while maintaining the particle diameter thereof at the time of polymerization is then re-dispersed in the rigid plastics thereby exhibiting impact-resistant strength specifically.

To recover the desired graft copolymer from emulsion polymerization latex, a granulation procedure for recovering the latex by coagulation is usually necessary. This granulation procedure has a significant influence not only on the powder characteristics of the recovered particles (distribution of particle diameters, amount of fine powder, fluidity etc.) but also on productivity in subsequent processes, for example on dehydration properties and drying properties. Conventionally, in order to recover a particulate polymer from the latex produced by emulsion polymerization, the latex is usually converted into a solid-in-liquid dispersion by adding a coagulating agent to coagulate the polymer in the liquid phase and then subjecting the dispersion to a process such as heat treatment, and thereafter the dispersion is dehydrated and dried to obtain powdery particulate synthetic resin. In this case, however, the shape of the resulting powder obtained is indefinite to permit inclusion of a considerable amount of fine powder causing frequent troubles in the process and deteriorating working atmosphere attributable to generation of the powdery dust. Accordingly, various examinations for improvement, for example proposal of novel granulation methods such as a gaseous phase coagulation method (see, for example, page 1, lower left column, line 13 to page 2, upper left column, line 3 in JP-A 52-68285) and a mild coagulation method (see, for example, page 2, lower left column, line 8 to lower right column, line 2 in JP-A60-217224), have been proposed. In spite of such enormous efforts, the amount of water and electric power used in a coagulation step, washing step and drying step in the various granulation methods as described above is extremely enormous as compared with that of the suspension polymerization process. Thus they cannot be satisfactory in respect of energy saving and still there is demand for development for new granulation methods including design of resin powder.

On the other hand, a suspension polymer which is formed into articles by a molding machine and is used generally as a thermoplastic resin in the field of molding processing, is rarely processed alone, but usually quality improving agents such as impact-strength modifiers or processability improving aids are added thereto. These quality improving agents are usually produced by emulsion polymerization and recovered as powder as described above. Before molding processing, processors generally conduct a compounding procedure wherein a quality improving agent is added to and mixed with the suspension polymer, in order to obtain molded products of excellent physical properties. At present, however, this compounding procedure causes deterioration in working atmosphere due to generation of powdery dust and thus forcing the processors to reduce working efficiency.

As the technique related to the present invention, there are disclosed an electrostatic image-developing toner comprising a core particle formed by polymerization and a coating layer consisting of fine particles formed by emulsion polymerization on the surface of the core particle, which has excellent frictional charging properties and excellent moisture absorption, and a process for producing the same (see, for example, page 2, lower left column, line 13 to lower right column, line 9 in JP-A 57-45558). However, this method cannot solve the problem of fine powder attributable to suspension polymerization, because of the necessity of a procedure of once recovering the suspension polymer and subsequent coating with the emulsion polymer.

To produce a toner satisfying both toner sticking property and low-temperature fixation ability, there are disclosed an electrostatic image-forming toner comprising suspension polymer particles, 95° or more of the surface of which is coated with an emulsion polymer, as well as a method of producing the same (see, for example, column [0007] in JP-A 2000-112174). However, this method is usable in only the above purpose, and the average particle diameter of the suspension polymer described in the specification is as small as 2 to 10 µm, and this method is irrelevant to a method of solving the problem of fine powder in suspension polymerization in the present invention.

A method wherein as a polymer used in foamed products, a styrene polymer by suspension polymerization is coated with an emulsion polymer is disclosed (see, for example, column 1, line 59 to column 2, line 5 in U.S. Pat. No. 4,307,134; column 2, lines 2 to 22 in U.S. Pat. No. 4,333,969; column 2, lines 6 to 22 in U.S. Pat. No. 4,333,970; and column 2, lines 2 to 19 in U.S. Pat. No. 4,385,156). However, these methods are not those for solving the problem of fine powder generated in suspension polymerization, and the object of these inventions is completely different from that of the present invention.

A suspension polymer containing anti-blocking granules and having a glass transition temperature of lower than 50° C., wherein the anti-blocking granules have a anti-blocking coating consisting of an emulsion polymer having a glass transition temperature of 50° C. or more, as well as a process for producing the same is disclosed (see, for example, column [0010] in JP-A 6-179754). It is described therein that this process is a process which can be used only for preventing thermal adhesion of a suspension polymer having a low glass transition temperature, that is, high adhesion, and also that an excessive amount of coating with a emulsion polymer is removed by washing at the time of dehydration. Thus, this cited invention is different from the present invention solving the problem of fine powder in washing waste water.

Further, an emulsion-suspension polymerization method is disclosed as a method which comprises partially coagulating an emulsion polymer latex and adding an ethylene monomers thereto under stirring to convert an emulsion into a suspension, followed by suspension polymerization (see, for example, page 2, upper right column, lines 13 to 20, in JP-A 56-50907). In this method, composite particles wherein a suspension polymer used usually as thermoplastic resin and emulsion polymer particles as an impact-resistance improver have been integrated can be produced. When this technique is used, a coagulation (granulation) step essential for recovery of emulsion polymerization latex can be omitted and the resulting particles have an excellent spherical shape including a very small amount of fine powder. As granulated particles not necessitating high drying energy (low water content after dehydration) can be obtained, this method is more advantageous than the existing emulsion process in respect of energy consumption, so that the problems in the suspension polymerization and emulsion polymerization process can be significantly reduced. This method, however, is inferior in productivity, such as extreme increase in viscosity upon conversion of an emulsion to a suspension, formation of a polymerization scale and a significantly long polymerization time for completion of emulsion polymerization and subsequent continuous suspension polymerization.

DISCLOSURE OF THE INVENTION

The present invention provides the particles of rigid molding thermoplastic polymer, which can solve a problem with fine particles in the suspension polymerization process, a problem for a reduction in energy consumption at the time of drying in the emulsion polymerization process, and a problem in compounding procedures for processors, as well as a process for producing the particles.

The present inventor made extensive study, and as a result, they made suspension-emulsified composite molding thermoplastic polymer particles comprising 100 parts by weight of suspension polymer particles having a glass transition temperature of 60° C. or more and an average particle diameter of 50 to 500 µm produced by suspension polymerization, the said suspension polymer particles being coated with 5 (inclusive) to 22 (exclusive) parts by weight of an emulsion polymer produced by emulsion polymerization, thus obtaining rigid molding thermoplastic polymer particles which, in the suspension polymerization process, are extremely excellent in filterability (solid-liquid separation) at the time of recovery of the molding thermoplastic polymer particles and can significantly reduce entrainment of fine particles into dehydration waste water and can, in the emulsion polymerization process, reduce the water content thereby reducing drying burden and significantly reducing energy consumption for drying, and can simplify the compounding procedure for processors.

That is, the present invention relates to molding thermoplastic polymer particles comprising 100 parts by weight of suspension polymer particles having a glass transition temperature of 60° C. or more and an average particle diameter of 50 to 500 µm produced by suspension polymerization, the said suspension polymer particles being coated with 5 (inclusive) to 22 (exclusive) parts by weight of an emulsion polymer produced by emulsion polymerization.

Preferably, the suspension polymer particles comprise 30 to 100% by weight of (meth)acrylate and 0 to 70% by weight of a vinyl monomer copolymerizable therewith.

Preferably, the emulsion polymer is obtained by graft-polymerizing 10 to 50 parts by weight of a monomer mixture consisting of 10 to 100% by weight of methacrylate, 0 to 90% by weight of an aromatic vinyl monomer, 0 to 25% by weight of a vinyl cyanide monomer, and 0 to 20% by weight of a vinyl monomer copolymerizable therewith in the presence of 50 to 90 parts by weight of the solids content of a rubber latex having a glass transition temperature of 0° C. or less consisting of 50 to 100% by weight of acrylate, 0 to 40% by weight of an aromatic vinyl monomer, 0 to 5% by weight of a crosslinking monomer, and 0 to 10% by weight of a vinyl monomer copolymerizable therewith, such that the total amount of the emulsion polymer becomes 100 parts by weight.

Preferably, the emulsion polymer is obtained by graft-polymerizing 5 to 20 parts by weight of a monomer mixture consisting of 20 to 80% by weight of at least one monomer selected from acrylate and methacrylate excluding methyl methacrylate, 20 to 80% by weight of methyl methacrylate, and 0 to 20% by weight of a vinyl monomer copolymerizable therewith in the presence of 80 to 95 parts by weight of the solids content of a polymer latex consisting of 50 to 95% by weight of methyl methacrylate, 5 to 50% by weight of methacrylate having a C2 to C8 alkyl group, and 0 to 20% by weight of a vinyl monomer copolymerizable therewith, such that the total amount of the emulsion polymer becomes 100 parts by weight.

Preferably, the emulsion polymer has a 3-layer structure obtained by polymerizing 40 to 90 parts by weight of a monomer mixture consisting of 60 to 100% by weight of alkyl acrylate, 0 to 40% by weight of a vinyl monomer copolymerizable therewith and 0.1 to 5% by weight of a crosslinking monomer in the presence of 10 to 60 parts by weight of the solids content of a polymer latex prepared by polymerizing 40 to 100% by weight of methyl methacrylate, 0 to 60% by weight of a vinyl monomer copolymerizable therewith and 0.01 to 10% by weight of a crosslinking monomer, to give a 2-layer polymer latex, and then polymerizing 11 to 67 parts by weight of a monomer mixture consisting of 60 to 100% by weight of (meth)acrylate and 0 to 40% by weight of a vinyl monomer copolymerizable therewith in the presence of 100 parts by weight of the solids content of the resulting 2-layer polymer latex.

The present invention relates to a process for producing molding thermoplastic polymer particles, which comprises the steps consisting of preparing a polymer suspension comprising suspension polymer particles having a glass transition temperature of 60° C. or more and an average particle diameter of 50 to 500 μm produced by suspension polymerization, mixing 5 (inclusive) to 22 (exclusive) parts by weight of an emulsion polymer with 100 parts by weight of the suspension polymer particles, regulating the mixture such that the solids content of the suspension mixed with the polymer is in the range of 35 to 40% by weight, adding an aqueous electrolyte solution at a temperature of not higher than the Vicat softening temperature of the emulsion polymer to the suspension mixed with the polymer, heating the suspension mixed with the polymer at a temperature of not lower than the Vicat softening temperature of the emulsion polymer, and recovering the molding thermoplastic polymer particles by solid-liquid separation.

Preferably, the suspension polymer particles comprise 30 to 100% by weight of (meth)acrylate and 0 to 70% by weight of a vinyl monomer copolymerizable therewith.

Preferably, the emulsion polymer is obtained by graft-polymerizing 10 to 50 parts by weight of a monomer mixture consisting of 10 to 100% by weight of methacrylate, 0 to 90% by weight of an aromatic vinyl monomer, 0 to 25% by weight of a vinyl cyanide monomer, and 0 to 20% by weight of a vinyl monomer copolymerizable therewith in the presence of 50 to 90 parts by weight of the solids content of a rubber latex having a glass transition temperature of 0° C. or less consisting of 50 to 100% by weight of acrylate, 0 to 40% by weight of an aromatic vinyl monomer, 0 to 5% by weight of a crosslinking monomer, and 0 to 10% by weight of a vinyl monomer copolymerizable therewith, such that the total amount of the emulsion polymer becomes 100 parts by weight.

Preferably, the emulsion polymer is obtained by graft-polymerizing 5 to 20 parts by weight of a monomer mixture consisting of 20 to 80% by weight of at least one monomer selected from acrylate and methacrylate excluding methyl methacrylate, 20 to 80% by weight of methyl methacrylate, and 0 to 20% by weight of a vinyl monomer copolymerizable therewith in the presence of 80 to 95 parts by weight of the solids content of a polymer latex consisting of 50 to 95% by weight of methyl methacrylate, 5 to 50% by weight of methacrylate having a C2 to C8 alkyl group, and 0 to 20% by weight of a vinyl monomer copolymerizable therewith, such that the total amount of the emulsion polymer becomes 100 parts by weight.

Preferably, the emulsion polymer has a 3-layer structure obtained by polymerizing 40 to 90 parts by weight of a monomer mixture consisting of 60 to 100% by weight of alkyl acrylate, 0 to 40% by weight of a vinyl monomer copolymerizable therewith and 0.1 to 5% by weight of a crosslinking monomer in the presence of 10 to 60 parts by weight of the solids content of a polymer latex prepared by polymerizing 40 to 100% by weight of methyl methacrylate, 0 to 60% by weight of a vinyl monomer copolymerizable therewith and 0.01 to 10% by weight of a crosslinking monomer, to give a 2-layer polymer latex, and then polymerizing 11 to 67 parts by weight of a monomer mixture consisting of 60, to 100% by weight of (meth)acrylate and 0 to 40% by weight of a vinyl monomer copolymerizable therewith in the presence of 100 parts by weight of the solids content of the resulting 2-layer polymer latex.

Preferably, the aqueous electrolyte solution is an aqueous solution of an inorganic salt.

The present invention relates to molding thermoplastic polymer particles comprising 100 parts by weight of suspension polymer particles having a glass transition temperature of 60° C. or more and an average particle diameter of 50 to 500 μm produced by suspension polymerization, the said suspension polymer particles being coated with 5 (inclusive) to 22 (exclusive) parts by weight of an emulsion polymer produced by emulsion polymerization.

The suspension polymer particles obtained by suspension polymerization are those having a glass transition temperature of 60° C. or more and an average particle diameter of 50 to 500 μm, obtained by suspension polymerization of a monomer or a monomer mixture.

In the suspension polymer particles, the content of (meth) acrylate is preferably 30 to 100% by weight, more preferably 70 to 100% by weight. When the content of (meth)acrylate is less than 30% by weight, the compatibility of the suspension polymer particles with the emulsion polymer used in the present invention is deteriorated, and thus an excellent molded article is hardly obtained. The content of the vinyl monomer copolymerizable with (meth)acrylate is preferably 0 to 70% by weight, more preferably 0 to 30% by weight.

The (meth)acrylate includes alkyl acrylates having a C10 or less alkyl group, such as methyl acrylate, ethyl acrylate, butyl acrylate and 2-ethylhexyl acrylate, and alkyl methacrylates having a C10 or less alkyl group, such as methyl methacrylate, ethyl methacrylate, butyl methacrylate and 2-ethylhexyl methacrylate. These monomers can be used alone or as a mixture of two or more thereof. Among these, methyl methacrylate, butyl methacrylate, ethyl acrylate and butyl acrylate are preferable because they can be combined with the emulsion polymer used in the present invention to form molded articles excellent in qualities.

The vinyl monomer copolymerizable with the (meth)acrylate includes (1) vinyl arenes such as styrene, α-methyl styrene, monochlorostyrene and dichlorostyrene, (2) vinyl carboxylic acids such as acrylic acid and methacrylic acid, (3) vinyl cyanides such as acrylonitrile and methacrylonitrile, (4) vinyl halides such as vinyl chloride, vinyl bromide and chloroprene, (5) vinyl acetate, (6) alkenes such as ethylene, propylene, butylene, butadiene and isobutylene, (7) alkene halides, and (8) multifunctional monomers such as allyl methacrylate, diallyl phthalate, triallyl cyanurate, monoethylene glycol dimethacrylate, tetraethylene glycol dimethacrylate, divinyl benzene and glycidyl methacrylate. Among these, styrene, α-methyl styrene, acrylic acid, methacrylic acid, acrylonitrile, vinyl acetate, allyl methacrylate and glycidyl methacrylate are preferable because they can be combined with the emulsion polymer used in the present invention to form molded articles excellent in qualities.

The suspension polymer particles can be homopolymer particles or mixed polymer particles prepared by copolymerizing or graft-polymerizing a monomer composition based on one or more of these monomers.

The average particle diameter of the suspension polymer particles is preferably a particle diameter of 50 to 500 μm obtained in usual suspension polymerization. The average particle diameter is preferably 75 to 300 μm, more preferably 100 to 250 μm. When the average particle diameter of the suspension polymer particles is less than 50 μm, filterability is deteriorated. It not preferable either that the average particle is higher than 500 μm because when the thermoplastic polymer particles of the present invention are further mixed in a powder form with a particulate compounding agent, the ability thereof to be mixed uniformly with the compounding agent is deteriorated.

The glass transition temperature of the suspension polymer particles is 60° C. or more. The glass transition temperature is preferably 65° C. or more, more preferably 70° C. or more. When the glass transition temperature of the suspension polymer particles is less than 60° C., the surface hardness of a molded article obtained by molding is lowered, and when it is used together with rigid plastics, scratches are caused. The glass transition temperature is a value determined by a differential scanning calorimeter.

As the dispersion stabilizer for suspension polymerization, a usual inorganic or organic dispersant can be used. The inorganic dispersant includes magnesium carbonate and calcium tertiary phosphate, and the organic dispersant includes natural products and synthetic polymer dispersants such as starch, gelatin, acrylamide, partially saponified polyvinyl alcohol, partially saponified polymethyl methacrylate, polyacrylic acid and the salts thereof, cellulose, methyl cellulose, hydroxymethyl cellulose, hydroxyethyl cellulose, polyalkylene oxide, polyvinyl pyrrolidone, polyvinyl imidazole and sulfonated polystyrene, and low-molecular dispersants or emulsifiers such as alkyl benzene sulfonates and fatty acid salts. The polymerization initiator for suspension polymerization includes peroxides such as benzoyl peroxide and lauroyl peroxide and azo compounds such as azobisisobutyronitrile.

For regulation of the molecular weight, a chain transfer agent may also be used, and the chain transfer agent includes C2 to C18 alkyl mercaptan, thioglycolate, mercapto acid such as β-mercaptopropionic acid, and aromatic mercaptans such as benzyl mercaptan, thiophenol, thiocresol and thionaphthol, particularly preferably C4 to C12 alkyl mercaptan.

As the method of producing the suspension polymer particles, it is possible to use any known methods such as a method which involves suspending a monomer or a monomer mixture in water and subjecting it to polymerization reaction, a method which involves suspending a part of a monomer or a monomer mixture in water to initiate polymerization reaction and then subjected to polymerization reaction by adding an aqueous suspension of the remainder of the monomer or monomer mixture to a polymerization reaction chamber in one portion or in divided portions or continuously as the polymerization proceeds, and a method which involves suspending a part of a monomer or a monomer mixture in water to initiate polymerization reaction and then subjected to polymerization reaction by adding the remainder of the monomer or monomer mixture to a polymerization reaction chamber in one portion or in divided portions or continuously as the polymerization proceeds.

The method of adding the polymerization initiator and the chain transfer agent is not particularly limited, but the most preferable method involves dissolving both the polymerization initiator and chain transfer agent in a monomer and then suspending the monomer in water followed by polymerization reaction thereof. The time necessary for polymerization is varied depending on the type and amount of the initiator or polymerization temperature, but is usually 1 to 24 hours. Components usually added in molding rigid plastics, for example, a plasticizer, a lubricant, a stabilizer and a UV absorber can also be added to the monomer at the time of suspension polymerization.

The emulsion polymer is an emulsion polymer produced by emulsion polymerization of a vinyl monomer. The emulsion polymer includes (1) an emulsion polymer obtained by graft-polymerizing 10 to 50 parts by weight of a monomer mixture consisting of 10 to 100% by weight of methacrylate, 0 to 90% by weight of an aromatic vinyl monomer, 0 to 25% by weight of a vinyl cyanide monomer, and 0 to 20% by weight of a vinyl monomer copolymerizable therewith in the presence of 50 to 90 parts by weight of the solids content of a rubber latex having a glass transition temperature of 0° C. or less consisting of 50 to 100% by weight of acrylate, 0 to 40% by weight of an aromatic vinyl monomer, 0 to 5% by weight of a crosslinking monomer, and 0 to 10% by weight of a vinyl monomer copolymerizable therewith, such that the total amount of the emulsion polymer becomes 100 parts by weight, (2) an emulsion polymer obtained by graft-polymerizing 5 to 20 parts by weight of a monomer mixture consisting of 20 to 80% by weight of at least one monomer selected from acrylate and methacrylate excluding methyl methacrylate, 20 to 80% by weight of methyl methacrylate, and 0 to 20% by weight of a vinyl monomer copolymerizable therewith in the presence of 80 to 95 parts by weight of the solids content of a polymer latex consisting of 50 to 95% by weight of methyl methacrylate, 5 to 50% by weight of methacrylate having a C2 to C8 alkyl group, and 0 to 20% by weight of a vinyl monomer copolymerizable therewith, such that the total amount of the emulsion polymer becomes 100 parts by weight, and (3) an emulsion polymer having a 3-layer structure obtained by polymerizing 40 to 90 parts by weight of a monomer mixture consisting of 60 to 100% by weight of alkyl acrylate, 0 to 40% by weight of a vinyl monomer copolymerizable therewith and 0.1 to 5% by weight of a crosslinking monomer in the presence of 10 to 60 parts by weight of the solids content of a polymer latex prepared by polymerizing 40 to 100% by weight of methyl methacrylate, 0 to 60% by weight of a vinyl monomer copolymerizable therewith and 0.01 to 10% by weight of a crosslinking monomer, to give a 2-layer polymer latex, and then polymerizing 11 to 67 parts by weight of a monomer mixture consisting of 60 to 100% by weight of (meth)acrylate and 0 to 40% by weight of a vinyl monomer copolymerizable therewith in the presence of 100 parts by weight of the solids content of the resulting 2-layer polymer latex.

The emulsion polymer (1) is preferable in respect of the improvement of the impact-resistant strength of molded articles obtained by molding the thermoplastic polymer particles of the present invention, the emulsion polymer (2) is preferable in respect of the improvement of the moldability of the thermoplastic polymer particles of the present invention, and the emulsion polymer (3) is preferable in respect of the improvement of the impact-resistant strength and transparency of molded articles obtained by molding the thermoplastic polymer particles of the present invention.

The general method of producing the emulsion polymers (1) to (3) is described in detail in for example JP-A 2-269755 and JP-A 8-217817. However, the method is not limited thereto.

The emulsion polymers (1) to (3) can be preferably used because the emulsion polymers are used widely as a quality improver for thermoplastic resin, and even if they are recovered as the molding thermoplastic polymer particles of the present invention, their various quality improving effects can be exhibited. However, the emulsion polymer is not limited thereto, and it is possible to use for example a single kind of polymer latex particles or mixed latex polymer particles wherein a monomer composition based on the following one or more monomers is copolymerized or graft-polymerized. For example, the vinyl monomer includes (1) acrylates including alkyl acrylates having a C10 or less alkyl group, such as methyl acrylate, ethylacrylate, butyl acrylate and 2-ethylhexyl acrylate, (2) methacrylates including alkyl methacrylates having a C10 or less, preferably C8 or less alkyl group, such as methyl methacrylate, ethyl methacrylate, butyl methacrylate and 2-ethylhexyl methacrylate, (3) aromatic vinyl monomers including vinyl arenes such as styrene, α-methyl styrene, monochlorostyrene and dichlorostyrene, (4) vinyl carboxylic acids such as acrylic acid and methacrylic acid, (5) vinyl cyanide monomers including vinyl cyanides such as acrylonitrile and methacrylonitrile, (6) vinyl halides such as vinyl chloride, vinyl bromide and chloroprene, (7) vinyl acetate, (8) alkenes such as ethylene, propylene, butylene, butadiene and isobutylene, and (9) crosslinking monomers including allyl methacrylate, diallyl phthalate, triallyl cyanurate, monoethylene glycol dimethacrylate, tetraethylene glycol dimethacrylate, divinyl benzene and glycidyl methacrylate.

The average particle diameter of the emulsion polymer is not particularly limited, but is preferably a particle diameter of 0.05 to 0.5 μm which is average particle diameter obtained in usual emulsion polymerization, more preferably a particle diameter of 0.06 to 0.3 μm. When the average particle diameter is less than 0.05 μm or higher than 0.5 μm, the molding processability of the thermoplastic polymer particles of the present invention, and the impact-resistant strength and transparency of the resulting molded articles, tend to be deteriorated.

The molding thermoplastic polymer particles of the present invention comprise 100 parts by weight of the suspension polymer particles coated with 5 (inclusive) to 22 (exclusive) parts by weight of the emulsion polymer. The content of the emulsion polymer is preferably 6 to 15 parts by weight, more preferably 7 to 10 parts by weight. When the content of the emulsion polymer is less than 5 parts by weight, the fine polymer particles remain in the system even after an aqueous electrolyte solution is added, thus resulting in failing to improve their filterability. On the other hand, when the content of the emulsion polymer is higher than 22 parts by weight, formation of coarse aggregated particles via the emulsion polymer tends to be increased.

The term "coated" means not only that the whole surface of the suspension polymer particles is coated with the emulsion polymer, but also that the surface of the polymer particles is coated partially with the emulsion polymer.

By coating the suspension polymer particles with the emulsion polymer, the average particle diameter of the suspension polymer particles is made greater by 3 to 50% than that of the particles before coating. When the change in the average particle diameter is less than 3%, the fine polymer particles remain in the system, resulting in failing to improve their filterability.

With the emulsion polymer, the surface of the suspension polymer particles is coated preferably not less than 50%, more preferably not less than 60%. When the coated surface is less than 50%, the powder characteristics of the thermoplastic polymer particles after recovery tend to be deteriorated.

Not all molding thermoplastic polymer particles obtained in the present invention may be coated with the emulsion polymer, and the molding thermoplastic polymer particles may contain the suspension polymer particles without being coated with the emulsion polymer and the residual emulsion polymer particles with which the suspension polymer particles are not coated.

The solids content of the rubber latex consisting of 50 to 100% by weight of acrylate, 0 to 40% by weight of an aromatic vinyl monomer, 0 to 5% by weight of a crosslinking monomer, and 0 to 10% by weight of a vinyl monomer copolymerizable therewith, described in the emulsion polymer (1), has a glass transition temperature of preferably 0° C. or less, more preferably −30° C. or less. When the glass transition temperature of the emulsion polymer is higher than 0° C., molded articles obtained by molding the thermoplastic polymer particles of the present invention hardly improve impact-resistant strength.

Further, the present invention relates to a process for producing molding thermoplastic polymer particles, which comprises the steps consisting of preparing a polymer suspension comprising suspension polymer particles having a glass transition temperature of 60° C. or more and an average particle diameter of 50 to 500 μm produced by suspension polymerization, mixing 5 (inclusive) to 22 (exclusive) parts by weight of an emulsion polymer with 100 parts by weight of the suspension polymer particles, regulating the mixture such that the solids content of the suspension mixed with the polymer emulsion is in the range of 35 to 40% by weight, adding an aqueous electrolyte solution at a temperature of not higher than the Vicat softening temperature of the emulsion polymer to the suspension mixed with the polymer emulsion (referred to hereinafter as the mixed polymer suspension), heating the mixed polymer suspension at a temperature of not lower than the Vicat softening temperature of the emulsion polymer, and recovering the molding thermoplastic polymer particles by solid-liquid separation. By the production process of the present invention, the surface of the suspension polymer particles can be uniformly coated with the emulsion polymer, and the remaining fine particle polymers causing deterioration in filterability can be significantly reduced.

Addition of the aqueous electrolyte solution to the mixed polymer suspension is superior to addition of the emulsion polymer (polymer latex) after addition of the aqueous electrolyte solution to the polymer suspension in respect of uniformity of a coating of the emulsion polymer on the surface of the suspension polymer particles and significant reduction of the remaining fine particle polymers causing deterioration in filterability.

The mixing ratio, in terms of solids content, of the polymer suspension comprising the suspension polymer particles produced by suspension polymerization to the emulsion polymer (polymer latex) produced by emulsion polymerization is selected such that the amount of the emulsion polymer is from 5 parts by weight or more to less than 22 parts by weight, based on 100 parts by weight of the suspension polymer particles. The mixing amount is preferably 6 to 15 parts by weight, more preferably 7 to 10 parts by weight. When the amount of the emulsion polymer is less than 5 parts by weight based on 100 parts by weight of the suspension polymer particles, the fine polymer particles remain in the system even after the addition of the aqueous electrolyte solution, and as a result, an effect of improving filterability is not observed. It is not preferable either that the amount of the emulsion polymer is 22 parts by weight or more based on 100 parts by weight of the suspension polymer particles because formation of coarse aggregated particles via the emulsion polymer tends to occur frequently.

The method of mixing the suspension polymer suspension produced by suspension polymerization, with the emulsion polymer latex produced by emulsion polymerization, preferably involves adding the emulsion polymer latex to the suspension polymer suspension under stirring or adding the suspension polymer suspension to the emulsion polymer latex under stirring. By mixing the polymer suspension with the emulsion polymer latex produced by emulsion polymerization, the mixed polymer suspension can be obtained.

When the emulsion polymer latex is mixed with the polymer suspension, the solids contents of the emulsion polymer latex and the polymer suspension are not particularly limited, and it is most easy in manufacturing and thus more preferable that the emulsion polymer latex or the polymer suspension obtained in the usual polymerization procedure is used as it is. Usually, the solids content of the emulsion polymer latex is preferably 25 to 45% by weight, more preferably 30 to 40% by weight. The solids content of the polymer suspension is preferably 33 to 45% by weight, more preferably 35 to 40% by weight. When the solids content of the emulsion polymer latex or the solids content of the polymer suspension is outside of this range, the fine polymer particles remain in the system even after an aqueous electrolyte solution is added, and as a result, there is a tendency to cause deterioration in productivity owing to failure to achieve an effect of improving filterability and frequent formation of coarse aggregated particles via the emulsion polymer.

The mixing temperature is preferably 5° C. or more, and a temperature less than 5° C. is not preferable because the amount of utility used in a subsequent heat treatment procedure is enormous.

The solids content of the mixed polymer suspension is adjusted in the range of 35 to 40% by weight. When the solids content is lower than 35% by weight, the fine polymer particles remain in the system even after the aqueous electrolyte solution is added. When the amount is higher than 40% by weight, formation of coarse aggregated particles via the emulsion polymer occurs frequently, and after dehydration, the water content is high. After the solids content of the mixed polymer suspension is adjusted in the range of 35 to 40% by weight, an aqueous electrolyte solution is added.

The aqueous electrolyte solution is added to the mixed polymer suspension at a temperature not higher than the Vicat softening temperature of the emulsion polymer. The aqueous electrolyte solution is added preferably at a temperature not higher than (Vicat softening temperature of the emulsion polymer minus 10° C.). When the aqueous electrolyte solution is added at a temperature higher than the Vicat softening temperature of the emulsion polymer, the molding thermoplastic polymer particles formed are deformed, and after dehydration, the water content is high, and the non-coagulated emulsion polymer remains to cause significant deterioration in filterability and frequent aggregation of the polymer particles.

The step of adding the aqueous electrolyte solution is preferably addition of the aqueous electrolyte solution to the mixed polymer suspension under stirring because together with the emulsion polymer particles, the fine polymer particles formed at the time of suspension polymerization can be coagulated (precipitated) on the surface of the suspension polymer particles so that the surface of the suspension polymer particles can be coated therewith.

The aqueous electrolyte solution that can be used in the present invention is not particularly limited insofar as it is an aqueous solution of an organic acid (salt) or an inorganic acid (salt) having properties by which the emulsion polymer latex can be coagulated and aggregated. Examples thereof include aqueous solutions of inorganic salts such as sodium chloride, potassium chloride, lithiumchloride, sodium bromide, potassium bromide, lithium bromide, potassium iodide, sodium iodide, potassium sulfate, sodium sulfate, ammonium sulfate, ammonium chloride, sodium nitrate, potassium nitrate, calcium chloride, ferrous sulfate, magnesium sulfate, zinc sulfate, copper sulfate, barium chloride, ferrous chloride, ferric chloride, magnesium chloride, ferric sulfate, aluminum sulfate, potassium alum and iron alum, aqueous solutions of inorganic acids such as hydrochloric acid, sulfuric acid, nitric acid and phosphoric acid, organic acids such as acetic acid and formic acid and aqueous solutions thereof, and aqueous solutions of organic acid salts such as sodium acetate, calcium acetate, sodium formate and calcium formate, which can be used alone or as a mixture of two or more thereof. Among these, aqueous solutions of inorganic salts such as sodium chloride, calcium chloride, sodium sulfate, ammonium chloride, calcium chloride, magnesium chloride, magnesium sulfate, barium chloride, ferrous chloride, aluminum sulfate, potassium alum and iron alum can be preferably used in respect of uniformity of a coating of the emulsion polymer on the surface of the suspension polymer particles, significant reduction of the remaining fine particle polymers causing deterioration in filterability, and easiness of disposal of waste water.

The concentration of the aqueous electrolyte solution is preferably 0.001% by weight or more, preferably 0.1% by weight or more, more preferably 1% by weight or more. When the concentration of the aqueous electrolyte solution is lower than 0.001% by weight, a larger amount of the aqueous electrolyte solution should be added to coagulate particles of the emulsion polymer, and the amount of utility used in a subsequent heat treatment procedure tends to be enormous.

When the ratio of the polymer latex in the mixed polymer suspension is high in producing the molding thermoplastic polymer particles of the present invention or when the speed of adding the aqueous electrolyte solution is extremely high, or when the concentration of the aqueous electrolyte solution is extremely high, there may be a significant increase in viscosity upon addition of the aqueous electrolyte solution. In this case, operation such as suitable addition of water to the system may be conducted to such an extent that the system can be maintained in a usual agitating state. The amount of the aqueous electrolyte solution is naturally varied depending on the ratio of the emulsion polymer in the mixed polymer suspension, and the aqueous electrolyte solution may be added in such an amount or more that the non-aggregated emulsion polymer particles are not present after heat treatment.

In the present invention, the polymer particles of low water content cannot be obtained by merely adding the aqueous electrolyte solution to the mixed polymer suspension. When the aqueous electrolyte solution is an acidic aqueous solution so that the mixed polymer suspension after granulation is acidic, the mixed polymer suspension is neutralized with an alkali such as sodium hydroxide and then heated to a temperature higher than the Vicat softening temperature of the emulsion polymer. The heating temperature is more preferably (Vicat softening temperature+5° C.).

When the aqueous electrolyte solution is a neutral aqueous solution, the mixed polymer suspension is heated as such to a temperature higher than the Vicat softening temperature of the emulsion polymer. The heating temperature is more preferably 50 to 120° C.

When the mixed polymer suspension is heated at a temperature lower than the Vicat softening temperature of the emulsion polymer, aggregates of the emulsion polymer particles with which the surface of the suspension polymer particles was coated are not made dense, and the water content of the molding thermoplastic polymer particles is not reduced.

The mixed polymer suspension is subjected to solid/liquid separation, whereby the molding thermoplastic polymer particles are recovered. In solid/liquid separation, dehydration and drying can be carried out in a usual manner. The molding thermoplastic polymer particles of the present invention are thereby obtained.

Figure 1:
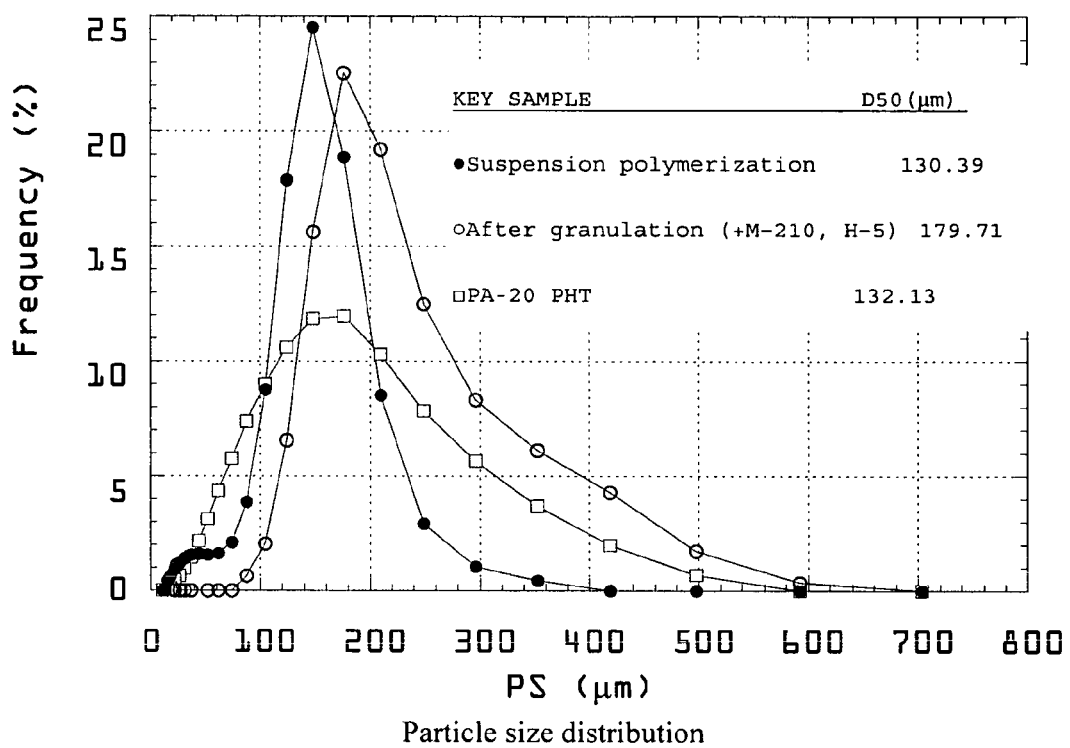
FIG. 1 is a graph showing particle distribution.

The symbols are as follows:

particle size distribution of the suspension polymer particles;

particle size distribution of the molding thermoplastic polymer particles;

particle size distribution of aggregated particles of only the emulsion polymer;

1: suspension polymer particle; and

2: molding thermoplastic polymer particle.

BEST MODE FOR CARRYING OUT THE INVENTION

Hereinafter, the present invention is described in more detail by reference to the Examples, but the present invention is not limited to the Examples.

Evaluation of the filterability of the mixed polymer suspension obtained in the Examples and Comparative Examples, evaluation of the color of a waste filtrate, quantification of fine polymer particle components and measurement of the water content after dehydration were carried out according to the following methods.

(Filterability)

When 500 g (solids content about 30 weight %) of the mixed polymer suspension obtained in the Examples and Comparative Examples was filtered under suction with an aspirator, the required time was evaluated under the following criteria:

○: A majority of water was filtered within 10 seconds.

Δ: 10 to 60 seconds were required.

×: 60 or more seconds were required.

(Color of Waste Filtrate)

When 500 g (solids content about 30 weight %) of the mixed polymer suspension obtained in the Examples and Comparative Examples was filtered under suction with an aspirator, the color of the waste filtrate was evaluated with the naked eye under the following criteria:

○: Transparent.

Δ: Slight turbid.

×: Significant turbid.

(Content of Fine Polymer Particle Components)

When 500 g (solids content about 30 weight %) of the mixed polymer suspension obtained in the Examples and Comparative Examples was left at 25° C. for 24 hours, 10 g supernatant was collected from the suspension and placed in a hot-air circulating drying oven at 100° C. for 12 hours to evaporate water. The content of fine polymer particle components was determined from the following equation:

Content of fine polymer particle components(%)= $(W2/W1) \times 100$

Wherein W1 is the weight of the supernatant before drying, and W2 is the weight after drying.

(Measurement of Water Content after Dehydration)

30 g of the mixed polymer suspension obtained in the Examples and Comparative Examples was filtered under suction with an aspirator, and then the dehydrated resin was recovered and placed in a hot-air circulating drying oven at 100° C. for 12 hours to evaporate water. The water content after dehydration was determined from the following equation:

Water content after dehydration(%)=$[(Ww-Wd)/Wd] \times 100$ wherein Ww is the weight of the resin just after dehydration and before drying, and Wd is the weight of the resin after drying.

The parts and % used in the Examples and Comparative Examples refer to parts by weight and by weight respectively.

(Measurement of Surface Hardness)

The molding thermoplastic polymer particles obtained in the Examples and Comparative Examples were molded into a molded sheet of about 1 mm in thickness. The surface hardness of the resulting molded sheet was measured with a Shore D surface hardness meter.

(Measurement of Glass Transition Temperature)

The glass transition temperature of the suspension polymer particles obtained in the Examples and Comparative Examples was measured at an increasing temperature of 5° C./min. with a differential scanning calorimeter (DSC220C manufactured by Seiko Denshi Kogyo Co., Ltd.).

(Measurement of Vicat Softening Temperature)

The Vicat softening temperature of the emulsion polymer obtained in the Examples and Comparative Examples was measured according to JIS K7206 (A-50 method).

(Measurement of Volume Average Particle Diameter)

(1) For the emulsion polymers in examples 1, 6 and 7, the volume average particle diameters were determined with use of Spectro-photometer U-2000 made by Hitachi Ltd., 546 nm wave length light scattering absorbing photometer. This method is based on the calibration curve which was prepared preliminary by the turbidity method.

(2) For suspension polymer particles and suspension-emulsion polymer particles in each example, volume average particle diameter was measured by Microtrac FRA-SVRSC made by NIKKISO Co. Ltd., including FIG. 1.

Example 1

A reactor equipped with a stirrer was charged with 153 parts of deionized water and 15 parts of 3% aqueous PVA solution (mixture of equal amounts of KH-20 and GH-20 manufactured by Nippon Synthetic Chemical Industry Co., Ltd.) and then the interior purged with nitrogen. 100 parts of a monomer methyl methacrylate containing 0.5 part of lauroyl peroxide, 0.5 part of benzoyl peroxide and 0.2 part of t-dodecyl mercaptan dissolved therein was added thereto, and the agitation speed of the stirrer was adjusted such that the particle diameter of the monomer dispersion became about 250 μm. Thereafter, the temperature of the mixture was increased stepwise such that the mixture was heated at 60° C. for 2 hours, at 70° C. for 2 hours, at 80° C. for 2 hours and at 90° C. for 1 hour to complete the polymerization, whereby a polymer suspension having a polymer solids content of 38% was prepared. The average particle diameter of the suspension polymer particles was 140 μm.

A reactor equipped with a stirrer was charged with 220 parts of deionized water, 0.3 part of boric acid, 0.03 part of sodium carbonate, 0.09 part of sodium N-lauroylsarcosinate 0.09 part of sodium formaldehydesulfoxylate, 0.006 part of sodium ethylenediaminetetraacetate and 0.002 part of ferrous sulfate.7$H_2O$, and then the interior is purged with nitrogen, followed by being heated to 80° C. 25% of a monomer mixture consisting of 25 parts of methyl methacrylate, 0.1 part of allyl methacrylate and 0.1 part of t-butyl hydroperoxide was introduced thereto in one portion and then polymerized for 45 hours. Then, the remainder (75%) of the mixture was added continuously over 1 hour. After this addition, the mixture was kept at the same temperature for 2 hours to complete the polymerization. Meanwhile, 0.2 part by weight of sodium N-lauroylsarcosinate was added thereto. The average particle diameter of the polymer particles in the resulting innermost layer crosslinked methacrylic polymer latex was 1600 Å (as determined by utilizing light scattering at a wavelength of 546 nm), and the degree of conversion into the polymer (amount of the formed polymer/amount of the charged monomer× 100) was 98%. While the resulting crosslinked methacrylic polymer latex was maintained at 80° C. in a nitrogen stream, 0.1 part by weight of potassium persulfate was added thereto, and then a monomer mixture of 41 parts by weight of n-butyl acrylate, 9 parts by weight of styrene and 1 part by weight of allyl methacrylate was added thereto continuously over 5 hours.

Meanwhile, 0.1 part of potassium oleate was added thereto in 3 divided portions. After the monomer mixture was added, 0.05 part by weight of potassium persulfate was added thereto and kept for 2 hour to complete the polymerization. The average particle diameter of the resulting polymer was 2300 Å, and the degree of conversion into the polymer was 99%. While the resulting rubber polymer latex was kept at 80° C., 0.02 part by weight of potassium persulfate was added thereto, and then a mixture of 24 parts by weight of methyl methacrylate, 1 part by weight of n-butyl acrylate and 0.1 part by weight of t-dodecyl mercaptan was added thereto continuously over 1 hour. After the monomer mixture was added, the mixture was kept for 1 hour to give an emulsion graft copolymer latex (B) having a multilayer structure with an average particle diameter of 0.25 μm and a Vicat softening temperature of 90° C. The solids content of the polymer latex (B) was 31% by weight.

After 265 parts (solids content 100 parts) of the polymer suspension thus obtained were adjusted to 60° C., 32 parts (solids content 10 parts) of the emulsion graft copolymer latex (B) and 6 parts of 15% aqueous sodium sulfate solution were added dropwise in this order to the polymer suspension under stirring. Thereafter, the polymer suspension was heat-treated by heating to 90° C. under stirring and then subjected to solid/liquid separation to give molding thermoplastic polymer particles.

Example 2

A reactor equipped with a stirrer was charged with 153 parts of deionized water and 15 parts of 3% aqueous PVA solution (mixture of equal amounts of KH-20 and GH-20 manufactured by Nippon Synthetic Chemical Industry Co., Ltd.) and then purged with nitrogen. A monomer mixture of 75 parts of methyl methacrylate and 25 parts of butyl acrylate containing 0.5 part of lauroyl peroxide, 0.5 part of benzoyl peroxide and 0.2 part of t-dodecyl mercaptan dissolved therein was added thereto, and the agitation speed of the stirrer was adjusted such that the particle diameter of the monomer dispersion became about 250 μm. Thereafter, the temperature of the mixture was increased stepwise such that the mixture was heated at 60° C. for 2 hours, at 70° C. for 2 hours, at 80° C. for 2 hours and at 90° C. for 1 hour to complete the polymerization, whereby a polymer suspension having a polymer solids content of 38% was prepared. The average particle diameter of the suspension polymer particles was 130 μm.

An emulsion graft copolymer latex (B) was prepared in the same manner as in Example 1.

After 265 parts (solids content 100 parts) of the polymer suspension thus obtained were adjusted to 60° C., 32 parts (solids content 10 parts) of the emulsion graft copolymer latex (B) and 6 parts of 15' aqueous sodium sulfate solution were added dropwise in this order to the polymer suspension under stirring. Thereafter, the polymer suspension was heat-treated by heating to 90° C. under stirring and then subjected to solid/liquid separation to give molding thermoplastic polymer particles.

Example 3

A reactor equipped with a stirrer was charged with 153 parts of deionized water and 15 parts of 3% aqueous PVA solution (mixture of equal amounts of KH-20 and GH-20 manufactured by Nippon Synthetic Chemical Industry Co., Ltd.) and then the interior of the reactor is purged with nitrogen. A monomer mixture of 70 parts of methyl methacrylate and 30 parts of butyl acrylate containing 0.5 part of lauroyl peroxide, 0.5 part of benzoyl peroxide and 0.2 part of t-dodecyl mercaptan dissolved therein was added thereto, and the agitation speed of the stirrer was adjusted such that the particle diameter of the monomer dispersion became about 250 μm. Thereafter, the temperature of the mixture was increased stepwise such that the mixture was heated at 60° C. for 2 hours, at 70° C. for 2 hours, at 80° C. for 2 hours and at 90° C. for 1 hour to complete the polymerization, whereby a polymer suspension having a polymer solids content of 38% was prepared. The average particle diameter of the suspension polymer particles was 140 μm.

Emulsion graft-copolymer latex (B) was prepared in the same manner as in Example 1.

After 265 parts (solids content 100 parts) of the suspension polymer suspension thus obtained were adjusted to 60° C., 32 parts (solids content 10 parts) of the emulsion graft copolymer latex (B) and 6 parts of 15% aqueous sodium sulfate solution were added dropwise in this order to the polymer suspension under stirring.

Thereafter, the polymer suspension was heat-treated by heating to 90° C. under stirring and then subjected to solid/liquid separation to give molding thermoplastic polymer particles.

Example 4

A reactor equipped with a stirrer was charged with 156 parts of deionized water and 15 parts of 3% aqueous PVA solution (mixture of equal amounts of KH-20 and GH-20 manufactured by Nippon Synthetic Chemical Industry Co., Ltd.) and then the interior of the reactor is purged with nitrogen. A monomer mixture of 75 parts of methyl methacrylate and 25 parts of butyl acrylate containing 0.5 part of lauroyl peroxide, 0.5 part of benzoyl peroxide and 0.2 part of t-dodecyl mercaptan dissolved therein was added thereto, and the agitation speed of the stirrer was adjusted such that the particle diameter of the monomer dispersion became about 250 μm. Thereafter, the temperature of the mixture was increased stepwise such that the mixture was heated at 60° C. for 2 hours, at 70° C. for 2 hours, at 80° C. for 2 hours and at 90° C. for 1 hour to complete the polymerization, whereby a polymer suspension having a polymer solids content of 37% was prepared. The average particle diameter of the suspension polymer particles was 130 μm.

Emulsion graft-copolymer latex (B) was prepared in the same manner as in Example 1.

After 268 parts (solids content 100 parts) of the polymer suspension thus obtained were adjusted to 60° C., 16 parts (solids content 5 parts) of the emulsion graft copolymer latex (B) and 6 parts of 15% aqueous sodium sulfate solution were added dropwise in this order to the suspension polymer suspension under stirring. Thereafter, the polymer suspension was heat-treated by heating to 90° C. under stirring and then subjected to solid/liquid separation to give molding thermoplastic polymer particles.

Example 5

A reactor equipped with a stirrer was charged with 147 parts of deionized water and 15 parts of 3% aqueous PVA solution (mixture of equal amounts of KH-20 and GH-20 manufactured by Nippon Synthetic Chemical Industry Co., Ltd.) and then the interior of the reactor is purged with nitrogen. A monomer mixture of 75 parts of methyl methacrylate and 25 parts of butyl acrylate containing 0.5 part of lauroyl peroxide, 0.5 part of benzoyl peroxide and 0.2 part of t-dodecyl mercaptan dissolved therein was added thereto, and the agitation speed of the stirrer was adjusted such that the particle diameter of the monomer dispersion became about 250 μm. Thereafter, the temperature of the mixture was increased stepwise such that the mixture was heated at 60° C. for 2 hours, at 70° C. for 2 hours, at 80° C. for 2 hours and at 90° C. for 1 hour to complete the polymerization, whereby a polymer suspension having a polymer solids content of 39% was prepared. The average particle diameter of the suspension polymer particles was 130 μm.

Emulsion graft-copolymer latex (B) was prepared in the same manner as in Example 1.

After 259 parts (solids content 100 parts) of the suspension polymer suspension thus obtained were adjusted to 60° C., 69 parts (solids content 21 parts) of the emulsion graft copolymer latex (B) and 6 parts of 15% aqueous sodium sulfate solution were added dropwise in this order to the polymer suspension under stirring. Thereafter, the polymer suspension was heat-treated by heating to 90° C. under stirring and then subjected to solid/liquid separation to give molding thermoplastic polymer particles.

Example 6

A reactor equipped with a stirrer was charged with 156 parts of deionized water and 15 parts of 3% aqueous PVA solution (mixture of equal amounts of KH-20 and GH-20 manufactured by The Nippon Synthetic Chemical Industry Co., Ltd.) and then hexed interior of the reactor is purged with nitrogen. A monomer mixture of 75 parts of methyl methacrylate and 25 parts of butyl acrylate containing 0.5 part of lauroyl peroxide, 0.5 part of benzoyl peroxide and 0.2 part of t-dodecyl mercaptan dissolved therein was added thereto, and the agitation speed of the stirrer was adjusted such that the particle diameter of the monomer dispersion became about 250 μm. Thereafter, the temperature of the mixture was increased stepwise such that the mixture was heated at 60° C. for 2 hours, at 70° C. for 2 hours, at 80° C. for 2 hours and at 90° C. for 1 hour to complete the polymerization, whereby a polymer suspension having a polymer solids content of 37% was prepared. The average particle diameter of the suspension polymer particles was 130 μm.

A reactor equipped with a stirrer was charged with 250 parts of water, 0.04 part of sodium oleate, 0.002 part of ferrous sulfate ($FeSO_4.7H_2O$), 0.008 part of EDTA2Na and 0.2 part of sodium formaldehydesulfoxylate, then the interior of the reactor is purged with nitrogen, and heated to 50° C. 10% by weight of a mixture of 100 parts of butyl acrylate, 1 part of allyl methacrylate and 0.2 part of cumene hydroperoxide was added thereto. 1 hour thereafter, the remainder (90 weight %) of the mixture was added continuously over 5 hours.

Simultaneously with the addition of the remainder of the mixture, 1 part of 5% aqueous potassium stearate was added continuously over 5 hours. The mixture was polymerized for 1 hour to give acrylate rubber latex having a polymerization conversion degree of 99%, an average particle diameter of 0.18 μm and a glass transition temperature of −40° C. Then, 225 parts (solids content 75 parts) of the acrylate rubber latex, 0.002 part of ferrous sulfate ($FeSO_4.7H_2O$), 0.004 part of EDTA.2Na and 0.1 part of sodium formaldehydesulfoxylate, then introduced into a reactor equipped with a stirrer, the interior of the reactor is purged with nitrogen, and heated to 70° C. A mixed solution of 23 parts of methyl methacrylate, 2 parts of butyl acrylate and 0.1 part of cumene hydroperoxide was added thereto over 3 hours, and then subjected to supplementary polymerization for 1 hour to give an emulsion graft copolymer latex (A) having an average particle diameter of 0.2 μm. The solids content of the emulsion graft copolymer latex (A) was 33% by weight. The Vicat softening temperature was 60° C.

After 268 parts (solids content 100 parts) of polymer suspension thus obtained were adjusted to 50° C., 30 parts (solids content 10 parts) of the emulsion graft copolymer latex (A) and 6 parts of 15% aqueous sodium sulfate solution were added dropwise in this order to the polymer suspension under stirring. Thereafter, the polymer suspension was heat-treated by heating to 90° C. under stirring and then subjected to solid/liquid separation to give molding thermoplastic polymer particles.

Example 7

A reactor equipped with a stirrer was charged with 159 parts of deionized water and 15 parts of 3% aqueous PVA solution (mixture of equal amounts of KH-20 and GH-20 manufactured by Nippon Synthetic Chemical Industry Co., Ltd.) and then the interior of the reactor is purged with nitrogen. A monomer mixture of 75 parts of methyl methacrylate and 25 parts of butyl acrylate containing 0.5 part of lauroyl peroxide, 0.5 part of benzoyl peroxide and 0.2 part of t-dodecyl mercaptan dissolved therein was added thereto, and the agitation speed of the stirrer was adjusted such that the particle diameter of the monomer dispersion became about 250 μm. Thereafter, the temperature of the mixture was increased stepwise such that the mixture was heated at 60° C. for 2 hours, at 70° C. for 2 hours, at 80° C. for 2 hours and at 90° C. for 1 hour to complete the polymerization, whereby a polymer suspension having a polymer solids content of 37% was prepared. The average particle diameter of the suspension polymer particles was 130 μm.

A reactor equipped with a stirrer was charged with 200 parts of deionized water, 1 part of sodium dioctylsulfosuccinate and 0.03 part of potassium persulfate, and then the interior of the reactor is purged with nitrogen, followed by being heated to 65° C. A monomer mixture consisting of 84 parts of methyl methacrylate and 16 parts of butyl methacrylate was added thereto over 4 hours, and the mixture was heated for 1 hour under stirring to complete the polymerization reaction substantially. Thereafter, a monomer mixture consisting of 11 parts of butyl acrylate and 9 parts of methyl methacrylate was added thereto over 1 hour, and then polymerized for 1.5 hours at 65° C., to give an emulsion graft copolymer latex (C) having an average particle diameter of 0.1 μm and a Vicat softening temperature of 90° C. The solids content of the emulsion polymerization graft copolymer latex (C) was 37% by weight.

After 271 parts (solids content 100 parts) of the polymer suspension thus obtained were adjusted to 70° C., 27 parts (solids content 10 parts) of the emulsion graft copolymer latex (C) and 6 parts of 15% aqueous sodium sulfate solution were added dropwise in this order to the polymer suspension under stirring. Thereafter, the polymer suspension was heat-treated by heating to 95° C. under stirring and then subjected to solid/liquid separation to give molding thermoplastic polymer particles.

Example 8

A reactor equipped with a stirrer was charged with 170 parts of deionized water and 15 parts of 3% aqueous PVA solution (mixture of equal amounts of KH-20 and GH-20 manufactured by Nippon Synthetic Chemical Industry Co., Ltd.) and then the interior is purged with nitrogen. A monomer mixture of 75 parts of methyl methacrylate and 25 parts of butyl acrylate containing 0.5 part of lauroyl peroxide, 0.5 part of benzoyl peroxide and 0.2 part of t-dodecyl mercaptan dissolved therein was added thereto, and the agitation speed of the stirrer was adjusted such that the particle diameter of the monomer dispersion became about 250 μm. Thereafter, the temperature of the mixture was increased stepwise such that the mixture was heated at 60° C. for 2 hours, at 70° C. for 2 hours, at 80° C. for 2 hours and at 90° C. for 1 hour to complete the polymerization, whereby a polymer suspension having a polymer solids content of 36% was prepared. The average particle diameter of the suspension polymer particles was 130 μm.

An emulsion graft copolymer latex (B) was prepared in the same manner as in Example 1.

After 282 parts (solids content 100 parts) of the polymer suspension thus obtained were adjusted to 60° C., 32 parts (solids content 10 parts) of the emulsion graft copolymer latex (B) and 6 parts of 15% aqueous sodium sulfate solution were added dropwise in this order to the polymer suspension under stirring. Thereafter, the polymer suspension was heat-treated by heating to 90° C. under stirring and then subjected to solid/liquid separation to give molding thermoplastic polymer particles.

Example 9

A reactor equipped with a stirrer was charged with 131 parts of deionized water and 15 parts of 3% aqueous PVA solution (mixture of equal amounts of KH-20 and GH-20 manufactured by Nippon Synthetic Chemical Industry Co., Ltd.) and then the interior is purged with nitrogen. A monomer mixture of 75 parts of methyl methacrylate and 25 parts of butyl acrylate containing 0.5 part of lauroyl peroxide, 0.5 part of benzoyl peroxide and 0.2 part of t-dodecyl mercaptan dissolved therein was added thereto, and the agitation speed of the stirrer was adjusted such that the particle diameter of the monomer dispersion became about 250 μm. Thereafter, the temperature of the mixture was increased stepwise such that the mixture was heated at 60° C. for 2 hours, at 70° C. for 2 hours, at 80° C. for 2 hours and at 90° C. for 1 hour to complete the polymerization, whereby a polymer suspension having a polymer solids content of 41% was prepared. The average particle diameter of the suspension polymer particles was 130 μm.

Emulsion graft-copolymer latex (B) was prepared in the same manner as in Example 1.

After 243 parts (solids content 100 parts) of the polymer suspension thus obtained were adjusted to 60° C., 32 parts (solids content 10 parts) of the emulsion graft copolymer latex (B) and 6 parts of 15% aqueous sodium sulfate solution were added dropwise in this order to the suspension polymer suspension under stirring. Thereafter, the polymer suspension was heat-treated by heating to 90° C. under stirring and then subjected to solid/liquid separation to give molding thermoplastic polymer particles.

Comparative Example 1

A reactor equipped with a stirrer was charged with 153 parts of deionized water and 15 parts of 3% aqueous PVA solution (mixture of equal amounts of KH-20 and GH-20 manufactured by Nippon Synthetic Chemical Industry Co., Ltd.) and then the interior is purged with nitrogen. A monomer mixture of 60 parts of methyl methacrylate and 40 parts of butyl acrylate containing 0.5 part of lauroyl peroxide, 0.5 part of benzoyl peroxide and 0.2 part of t-dodecyl mercaptan dissolved therein was added thereto, and the agitation speed of the stirrer was adjusted such that the particle diameter of the monomer dispersion became about 250 μm. Thereafter, the temperature of the mixture was increased stepwise such that the mixture was heated at 60° C. for 2 hours, at 70° C. for 2 hours, at. 80° C. for 2 hours and at 90° C. for 1 hour to complete the polymerization, whereby a polymer suspension having a polymer solids content of 38% was prepared. The average particle diameter of the suspension polymer particles was 140 μm.

An emulsion graft copolymer latex (B) was prepared in the same manner as in Example 1.

After 265 parts (solids content 100 parts) of the suspension polymer suspension thus obtained were adjusted to 60° C., 32 parts (solids content 10 parts) of the emulsion graft copolymer latex (B) and 6 parts of 15% aqueous sodium sulfate solution were added dropwise in this order to the polymer suspension under stirring. Thereafter, the polymer suspension was heat-treated by heating to 90° C. under stirring and then subjected to solid/liquid separation to give molding thermoplastic polymer particles.

Comparative Example 2

A reactor equipped with a stirrer was charged with 158 parts of deionized water and 15 parts of 3% aqueous PVA solution (mixture of equal amounts of KH-20 and GH-20 manufactured by Nippon Synthetic Chemical Industry Co., Ltd.) and then the interior is purged with nitrogen. A monomer mixture of 75 parts of methyl methacrylate and 25 parts of butyl acrylate containing 0.5 part of lauroyl peroxide, 0.5 part of benzoyl peroxide and 0.2 part of t-dodecyl mercaptan dissolved therein was added thereto, and the agitation speed of the stirrer was adjusted such that the particle diameter of the monomer dispersion became about 250 μm. Thereafter, the temperature of the mixture was increased stepwise such that the mixture was heated at 60° C. for 2 hours, at 70° C. for 2 hours, at 80° C. for 2 hours and at 90° C. for 1 hour to complete the polymerization, whereby a polymer suspension having a polymer solids content of 37% was prepared. The average particle diameter of the suspension polymer particles was 130 μm.

An emulsion graft copolymer latex (B) was prepared in the same manner as in Example 1.

After 270 parts (solids content 100 parts) of the polymer suspension thus obtained were adjusted to 60° C., 6.4 parts (solids content 2 parts) of the emulsion graft copolymer latex (B) and 6 parts of 15% aqueous calcium chloride solution were added dropwise in this order to the polymer suspension under stirring. Thereafter, the polymer suspension was heat-treated by heating to 90° C. under stirring and then subjected to solid/liquid separation to give molding thermoplastic polymer particles.

Comparative Example 3

A reactor equipped with a stirrer was charged with 158 parts of deionized water and 15 parts of 3% aqueous PVA solution (mixture of equal amounts of KH-20 and GH-20 manufactured by Nippon Synthetic Chemical Industry Co., Ltd.) and then the interior is purged with nitrogen. A monomer mixture of 75 parts of methyl methacrylate and 25 parts of butyl acrylate containing 0.5 part of lauroyl peroxide, 0.5 part of benzoyl peroxide and 0.2 part of t-dodecyl mercaptan dissolved therein was added thereto, and the agitation speed of the stirrer was adjusted such that the particle diameter of the monomer dispersion became about 250 μm. Thereafter, the temperature of the mixture was increased stepwise such that the mixture was heated at 60° C. for 2 hours, at 70° C. for 2 hours, at 80° C. for 2 hours and at 90° C. for 1 hour to complete the polymerization, whereby a polymer suspension having a polymer solids content of 37% was prepared. The average particle diameter of the suspension polymer particles was 130 μm.

After 270 parts (solids content 100 parts) of the polymer suspension thus obtained were adjusted to 60° C., 15% aqueous sodium sulfate solution was added to the polymer suspension under stirring. Thereafter, the polymer suspension was heat-treated by heating to 90° C. under stirring and then subjected to solid/liquid separation to give molding thermoplastic polymer particles.

Comparative Example 4

A reactor equipped with a stirrer was charged with 220 parts of deionized water and 15 parts of 3% aqueous PVA solution (mixture of equal amounts of KH-20 and GH-20 manufactured by Nippon Synthetic Chemical Industry Co., Ltd.) and then the interior is purged with nitrogen. A monomer mixture of 75 parts of methyl methacrylate and 25 parts of butyl acrylate containing 0.5 part of lauroyl peroxide, 0.5 part of benzoyl peroxide and 0.2 part of t-dodecyl mercaptan dissolved therein was added thereto, and the agitation speed of the stirrer was adjusted such that the particle diameter of the monomer dispersion became about 250 μm. Thereafter, the temperature of the mixture was increased stepwise such that the mixture was heated at 60° C. for 2 hours, at 70° C. for 2 hours, at 80° C. for 2 hours and at 90° C. for 1 hour to complete the polymerization, whereby a polymer suspension having a polymer solids content of 30% was prepared. The average particle diameter of the suspension polymer particles was 130 μm.

An emulsion graft copolymer latex (B) was prepared in the same manner as in Example 1.

After 331 parts (solids content 100 parts) of the polymer suspension thus obtained were adjusted to 60° C., 32 parts (solids content 10 parts) of the emulsion graft copolymer latex (B) and 6 parts of 15% aqueous calcium chloride solution were added dropwise in this order to the polymer suspension under stirring. Thereafter, the polymer suspension was heat-treated by heating to 90° C. under stirring and then subjected to solid/liquid separation to give molding thermoplastic polymer particles.

Comparative Example 5

A reactor equipped with a stirrer was charged with 220 parts of deionized water and 15 parts of 3% aqueous PVA solution (mixture of equal amounts of KH-20 and GH-20 manufactured by Nippon Synthetic Chemical Industry Co., Ltd.) and then the interior is purged with nitrogen. A monomer mixture of 75 parts of methyl methacrylate and 25 parts of butyl acrylate containing 0.5 part of lauroyl peroxide, 0.5 part of benzoyl peroxide and 0.2 part of t-dodecyl mercaptan dissolved therein was added thereto, and the agitation speed of the stirrer was adjusted such that the particle diameter of the monomer dispersion became about 250 μm. Thereafter, the temperature of the mixture was increased stepwise such that the mixture was heated at 60° C. for 2 hours, at 70° C. for 2 hours, at 80° C. for 2 hours and at 90° C. for 1 hour to complete the polymerization, whereby a polymer suspension having a polymer solids content of 30% was prepared. The average particle diameter of the polymer particles was 130

An emulsion graft copolymer latex (B) was prepared in the same manner as in Example 1.

After 80 parts of water were added to 331 parts (solids content 100 parts) of the polymer suspension thus obtained were adjusted to 60° C., 32 parts (solids content 10 parts) of the emulsion graft copolymer latex (B) and 6 parts of 15% aqueous calcium chloride solution were added dropwise in this order to the polymer suspension under stirring. Thereafter, the polymer suspension was heat-treated by heating to 90° C. under stirring and then subjected to solid/liquid separation to give molding thermoplastic polymer particles.

Comparative Example 6

A reactor equipped with a stirrer was charged with 110 parts of deionized water and 15 parts of 3% aqueous PVA solution (mixture of equal amounts of KH-20 and GH-20 manufactured by Nippon Synthetic Chemical Industry Co., Ltd.) and then the interior is purged with nitrogen. A monomer mixture of 75 parts of methyl methacrylate and 25 parts of butyl acrylate containing 0.5 part of lauroyl peroxide, 0.5 part of benzoyl peroxide and 0.2 part of t-dodecyl mercaptan dissolved therein was added thereto, and the agitation speed of the stirrer was adjusted such that the particle diameter of the monomer dispersion became about 250 μm. Thereafter, the temperature of the mixture was increased stepwise such that the mixture was heated at 60° C. for 2 hours, at 70° C. for 2 hours, at 80° C. for 2 hours and at 90° C. for 1 hour to complete the polymerization, whereby a polymer suspension having a polymer solids content of 45% was prepared. The average particle diameter of the suspension polymer particles was 130 μm.

An emulsion polymer graft copolymer latex (B) was prepared in the same manner as in Example 1.

After 223 parts (solids content 100 parts) of the polymer suspension thus obtained were adjusted to 60° C., 32 parts (solids content 10 parts) of the emulsion graft copolymer latex (B) and 6 parts of 15% aqueous sodium sulfate solution were added dropwise in this order to the polymer suspension under stirring. Thereafter, the polymer suspension was heat-treated by heating to 90° C. under stirring and then subjected to solid/liquid separation to give molding thermoplastic polymer particles.

Comparative Example 7

An emulsion polymer polymer graft copolymer latex (B) was prepared in the same manner as in Example 1. 65 parts of water were added to 100 parts (solids content 31 parts) of the emulsion graft copolymer latex, and 50 parts of 3% aqueous calcium chloride solution were added thereto at 55° C. under stirring, and a coagulation procedure was carried out, and thereafter the reaction mixture was heat-treated by heating to 95° C. under stirring and then subjected to solid/liquid separation to give molding thermoplastic polymer particles.

Reference Example

A reactor equipped with a stirrer was charged with 144 parts of deionized water and 15 parts of 3% aqueous PVA solution (mixture of equal amounts of KH-20 and GH-20 manufactured by Nippon Synthetic Chemical Industry Co., Ltd.) and then the interior is purged with nitrogen. A monomer mixture of 75 parts of methyl methacrylate and 25 parts of butyl acrylate containing 0.5 part of lauroyl peroxide, 0.5 part of benzoyl peroxide and 0.2 part of t-dodecyl mercaptan dissolved therein was added thereto, and the agitation speed of the stirrer was adjusted such that the particle diameter of the monomer dispersion became about 250 μm. Thereafter, the temperature of the mixture was increased stepwise such that the mixture was heated at 60° C. for 2 hours, at 70° C. for 2 hours, at 80° C. for 2 hours and at 90° C. for 1 hour to complete the polymerization, whereby a suspension polymer suspension having a polymer solids content of 39% was prepared. The average particle diameter of the suspension polymer particles was 130 μm.

An emulsion graft copolymer latex (B) was prepared in the same manner as in Example 1.

After 256 parts (solids content 1100 parts) of the polymer suspension thus obtained were adjusted to 60° C., 96 parts (solids content 30 parts) of the emulsion graft copolymer latex (B) and 6 parts of 15% aqueous sodium sulfate solution were added dropwise in this order to the polymer suspension under stirring. Thereafter, the polymer suspension was heat-treated by heating to 90° C. under stirring and then subjected to solid/liquid separation to give molding thermoplastic polymer particles.

Tables 1 and 2 show the evaluation results of the composition of the suspension polymer particles obtained in each of Examples 1 to 9 and Comparative Examples 1 to 6, the type of the emulsion polymer, the weight ratio of the suspension polymer particle/emulsion polymer, the solids content of the mixed polymer suspension, the filterability thereof, the color of the waste filtrate, the content of the fine polymer particle components, the water content after dehydration, the glass transition temperature of the suspension polymer particles, and the surface hardness thereof.

TABLE 1

|  | Composition of suspension polymer particles | Type of emulsion polymer | Suspension polymer particle/emulsion polymer (weight ratio) | Solids content of mixed polymer suspension (%) |
|---|---|---|---|---|
| Example 1 | MMA/BA = 100/0 | B | 100/10 | 37 |
| Example 2 | MMA/BA = 75/25 | B | 100/10 | 37 |
| Example 3 | MMA/BA = 70/30 | B | 100/10 | 37 |
| Example 4 | MMA/BA = 75/25 | B | 100/5 | 37 |
| Example 5 | MMA/BA = 75/25 | B | 100/21 | 37 |
| Example 6 | MMA/BA = 75/25 | A | 100/10 | 37 |
| Example 7 | MMA/BA = 75/25 | C | 100/10 | 37 |
| Example 8 | MMA/BA = 75/25 | B | 100/10 | 35 |
| Example 9 | MMA/BA = 75/25 | B | 100/10 | 45 |
| Comparative Example 1 | MMA/BA = 60/40 | B | 100/10 | 37 |
| Comparative Example 2 | MMA/BA = 75/25 | B | 100/2 | 37 |
| Comparative Example 3 | MMA/BA = 75/25 | — | 100/0 | 37 |
| Comparative Example 4 | MMA/BA = 75/25 | B | 100/10 | 30 |
| Comparative Example 5 | MMA/BA = 75/25 | B | 100/10 | 25 |
| Comparative Example 6 | MMA/BA = 75/25 | B | 100/10 | 50 |
| Comparative Example 7 | — | B | 0/100 | 15 |
| Reference Example | MMA/BA = 75/25 | B | 100/30 | 37 |

TABLE 2

|  | Filterability | Color of waste filtrate | Content of fine polymer particle components (%) | Water content after dehydration (%) | Glass transition temperature of suspension polymer particles (° C.) | Surface hardness |
|---|---|---|---|---|---|---|
| Example 1 | ○ | ○ | 0.3 | 22 | 105 | 90 |
| Example 2 | ○ | ○ | 0.3 | 23 | 72 | 78 |
| Example 3 | ○ | ○ | 0.2 | 23 | 65 | 70 |
| Example 4 | ○ | ○ | 0.3 | 21 | 72 | 78 |

TABLE 2-continued

|  | Filterability | Color of waste filtrate | Content of fine polymer particle components (%) | Water content after dehydration (%) | Glass transition temperature of suspension polymer particles (° C.) | Surface hardness |
|---|---|---|---|---|---|---|
| Example 5 | ○ | ○ | 0.2 | 27 | 72 | 75 |
| Example 6 | ○ | ○ | 0.4 | 13 | 72 | 75 |
| Example 7 | ○ | ○ | 0.2 | 25 | 72 | 80 |
| Example 8 | ○ | ○ | 0.3 | 23 | 72 | 80 |
| Example 9 | ○ | ○ | 0.2 | 25 | 72 | 78 |
| Comparative Example 1 | ○ | ○ | 0.3 | 22 | 72 | 65 |
| Comparative Example 2 | Δ | X | 2.8 | 18 | 50 | 80 |
| Comparative Example 3 | X | X | 3.3 | Not filterable | 72 | 80 |
| Comparative Example 4 | Δ | Δ | 1.4 | 27 | 72 | 75 |
| Comparative Example 5 | Δ | X | 1.8 | 32 | 72 | 78 |
| Comparative Example 6 | ○ | ○ | 0.4 | 37 | 72 | 78 |
| Comparative Example 7 | ○ | ○ | 0.1 | 48 | — | — |
| Reference Example | ○ | ○ | 0.2 | 32 | 72 | 78 |

From the results, it can be seen that in view of the content of the fine polymer particle components, the polymer particle compositions of the invention in Examples 1 to 9, as compared with that of Comparative Example 3 where suspension polymerization only was carried out, had a very small amount of fine polymer particles in the polymer suspension, and as a result the filterability of the mixed polymer suspension was extremely excellent, and the waste filtrate was transparent. It can be seen that when the amount of the emulsion polymer was lower than 5 parts by weight based on 100 parts by weight of the suspension polymer particles in Examples 1 to 9 and Comparative Example 2, and when the solids content of the mixed polymer suspension upon dropwise addition of the aqueous electrolyte solution in Comparative Examples 4 and 5 was lower than 35% by weight, the effect of improving filterability was low, and the waste filtrate was turbid, thus indicating that fine polymer particles remained in the mixed polymer suspension.

On the other hand, it can be seen that in view of the water content after dehydration, the molding thermoplastic polymer particles of the invention in Examples 1 to 9, as compared with that of Comparative Example 7 where the emulsion polymer latex was recovered by only the conventional coagulation procedure, indicated an extremely low water content after dehydration, thus enabling significant reduction in energy consumption in drying. It can be seen that when the amount of the emulsion polymer was higher than 22 parts by weight based on 100 parts by weight of the suspension polymer particles in the Reference Example or when the solids content upon dropwise addition of the aqueous electrolyte solution was higher than 40% by weight in Comparative Example 6, the water content after dehydration was high.

A sheet obtained by molding the molding thermoplastic polymer particle compositions of the invention in each of Examples 1 to 9 can be seen to have a surface hardness of 70 or more enough to serve as a suspension polymer.

FIG. 1 is a graph showing the particle size distribution of the suspension polymer particles and molding thermoplastic polymer particles obtained in Example 5 and that of the aggregated particles of the sole emulsion polymer obtained in Comparative Example 7.

In FIG. 1, "●" shows the particle size distribution of the suspension polymer particles, "○" shows the particle size distribution of the molding thermoplastic polymer particles, and "□" shows the particle size distribution of the aggregated particles of the sole emulsion polymer.

The average particle diameter of the suspension polymer particles was 130 μm, the average particle diameter of the molding thermoplastic polymer particles was 179.31 μm, and the average particle diameter of the aggregated particles of the sole emulsion polymer was 132.13 μm. It can therefore be seen that the particle size distribution of the molding thermoplastic polymer particles, as compared with the suspension polymer particles, was shifted toward a larger particle diameter by about 40 μm. It can be seen that the molding thermoplastic polymer particles as compared with the suspension polymer particles had an extremely low frequency of particles having a particle diameter of 50 μm or less causing deterioration in filterability.

In FIG. 1, particle size distribution (μm) is shown on the abscissa axis, and frequency on the ordinate axis (%)

Figure 2:
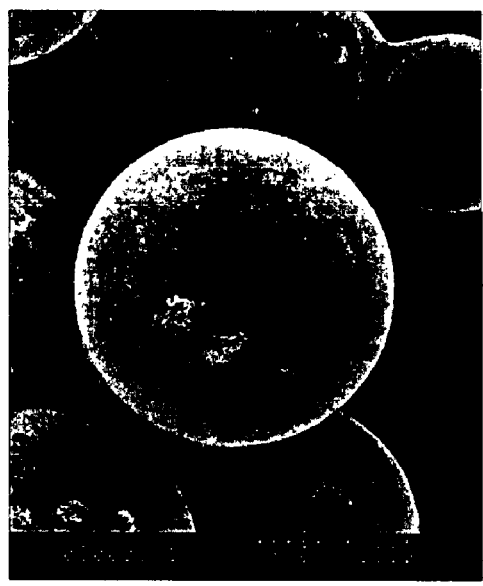
FIG. 2 is a photograph (×300) showing the surface state of the suspension polymer particles and molding thermoplastic polymer particles obtained in Example 5, respectively.
Figure 2:
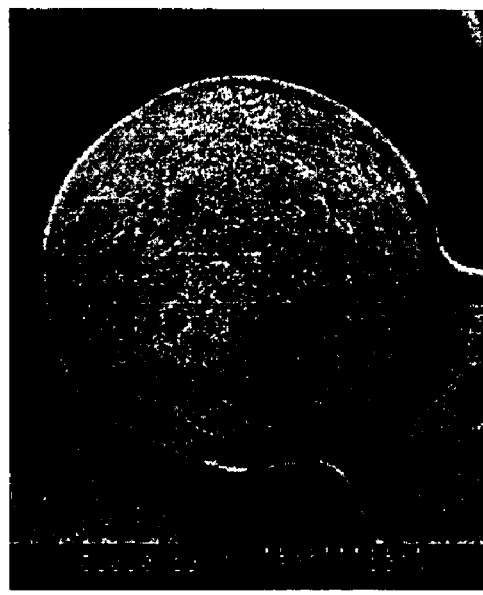

FIG. 2 is a photograph (×300) showing the surface state of the suspension polymer particles and molding thermoplastic polymer particles obtained in Example 5. In FIG. 2, (a) shows the suspension polymer particles and (b) shows the molding thermoplastic polymer particles. It can be seen that the surface of the suspension polymer particle 1 is coated with the emulsion polymer to give molding thermoplastic polymer particle 2. The photographs were taken with a field emission scanning electron microscope (S-800 model manufactured by Hitachi, Ltd.).

INDUSTRIAL APPLICABILITY

The molding thermoplastic polymer particles of the present invention can be used as a rigid molding thermoplastic polymer particle composition to recover suspension polymer particles and emulsion polymers thereby solving a problem with fine particles in a suspension polymerization process, a problem for a reduction in energy consumption at the time of drying in an emulsion polymerization process, and a operation problem in compounding procedures for processors.

The invention claimed is:

1. A molding thermoplastic polymer particle composition comprising molding thermoplastic polymer particles comprising:
   100 parts by weight of suspension polymer particles having a glass transition temperature of 60° C. or more and an average particle diameter of 50 to 500 μm produced by suspension polymerization, and
   5 (inclusive) to 22 (exclusive) parts by weight of an emulsion polymer produced by emulsion polymerization,
   wherein the suspension polymer particles comprise 30 to 100% by weight of (meth)acrylate and 0 to 70% by weight of a vinyl monomer copolymerizable therewith, and
   wherein the suspension polymer particles are coated with the emulsion polymer, and the average particle diameter of the molding thermoplastic polymer particles is made greater by 3 to 50% than that of the suspension polymer particles before coating in their particle size distribution.

2. The molding thermoplastic polymer particle composition according to claim 1, wherein the emulsion polymer is obtained by graft-polymerizing 10 to 50 parts by weight of a monomer mixture consisting of 10 to 100% by weight of methacrylate, 0 to 90% by weight of an aromatic vinyl monomer, 0 to 25% by weight of a vinyl cyanide monomer, and 0 to 20% by weight of a vinyl monomer copolymerizable therewith in the presence of 50 to 90 parts by weight of the solids content of a rubber latex having a glass transition temperature of 0° C. or less consisting of 50 to 100% by weight of acrylate, 0 to 40% by weight of an aromatic vinyl monomer, 0 to 5% by weight of a crosslinking monomer, and 0 to 10% by weight of a vinyl monomer copolymerizable therewith, such that the total amount of the emulsion polymer becomes 100 parts by weight.

3. The molding thermoplastic polymer particle composition according to claim 1, wherein the emulsion polymer is obtained by graft-polymerizing 5 to 20 parts by weight of a monomer mixture consisting of 20 to 80% by weight of at least one monomer selected from acrylate and methacrylate excluding methyl methacrylate, 20 to 80% by weight of methyl methacrylate, and 0 to 20% by weight of a vinyl monomer copolymerizable therewith in the presence of 80 to 95 parts by weight of the solids content of a polymer latex consisting of 50 to 95% by weight of methyl methacrylate, 5 to 50% by weight of methacrylate having a C2 to C8 alkyl group, and 0 to 20% by weight of a vinyl monomer copolymerizable therewith, such that the total amount of the emulsion polymer becomes 100 parts by weight.

4. The molding thermoplastic polymer particle composition according to claim 1, wherein the emulsion polymer has a 3-layer structure obtained by polymerizing 40 to 90 parts by weight of a monomer mixture consisting of 60 to 100% by weight of alkyl acrylate, 0 to 40% by weight of a vinyl monomer copolymerizable therewith and 0.1 to 5% by weight of a crosslinking monomer in the presence of 10 to 60 parts by weight of the solids content of a polymer latex prepared by polymerizing 40 to 100% by weight of methyl methacrylate, 0 to 60% by weight of a vinyl monomer copolymerizable therewith and 0 to 10% by weight of a crosslinking monomer, to give a 2-layer polymer latex, and then polymerizing 11 to 67 parts by weight of a monomer mixture consisting of 60 to 100% by weight of (meth)acrylate and 0 to 40% by weight of a vinyl monomer copolymerizable therewith in the presence of 100 parts by weight of the solids content of the resulting 2-layer polymer latex.

5. A process for producing the molding thermoplastic polymer particle composition according to claim 1, which comprises the steps consisting of preparing a polymer suspension comprising suspension polymer particles having a glass transition temperature of 60° C. or more and an average particle diameter of 50 to 50 μm produced by suspension polymerization, mixing 5 (inclusive) to 22 (exclusive) parts by weight of an emulsion polymer with 100 parts by weight of the suspension polymer particles, regulating the mixture such that the solids content of the suspension mixed with the polymer is in the range of 35 to 40% by weight, adding an aqueous electrolyte solution at a temperature of not higher than the Vicat softening temperature of the emulsion polymer to the suspension mixed with the polymer, heating the suspension mixed with the polymer at a temperature of not lower than the Vicat softening temperature of the emulsion polymer, and recovering the molding thermoplastic polymer particles by solid-liquid separation.

6. The process for producing the molding thermoplastic polymer particle composition according to claim 5, wherein the suspension polymer particles comprise 30 to 100% by weight of (meth)acrylate and 0 to 70% by weight of a vinyl monomer copolymerizable therewith.

7. The process for producing the molding thermoplastic polymer particle composition according to claim 6, wherein the emulsion polymer is obtained by graft-polymerizing 10 to 50 parts by weight of a monomer mixture consisting of 10 to 100% by weight of methacrylate, 0 to 90% by weight of an aromatic vinyl monomer, 0 to 25% by weight of a vinyl cyanide monomer, and 0 to 20% by weight of a vinyl monomer copolymerizable therewith in the presence of 50 to 90 parts by weight of the solids content of a rubber latex having a glass transition temperature of 0° C. or less consisting of 50 to 100% by weight of acrylate, 0 to 40% by weight of an aromatic vinyl monomer, 0 to 5% by weight of a crosslinking monomer, and 0 to 10% by weight of a vinyl monomer copolymerizable therewith, such that the total amount of the emulsion polymer becomes 100 parts by weight.

8. The process for producing the molding thermoplastic polymer particle composition according to claim 6, wherein the emulsion polymer is obtained by graft-polymerizing 5 to 20 parts by weight of a monomer mixture consisting of 20 to 80% by weight of at least one monomer selected from acrylate and methacrylate excluding methyl methacrylate, 20 to 80% by weight of methyl methacrylate, and 0 to 20% by weight of a vinyl monomer copolymerizable therewith in the presence of 80 to 95 parts by weight of the solids content of a polymer latex consisting of 50 to 95% by weight of methyl methacrylate, 5 to 50% by weight of methacrylate having a C2 to C8 alkyl group, and 0 to 20% by weight of a vinyl monomer copolymerizable therewith, such that the total amount of the emulsion polymer becomes 100 parts by weight.

9. The process for producing the molding thermoplastic polymer particle composition according to claim 6, wherein the emulsion polymer has a 3-layer structure obtained by polymerizing 40 to 90 parts by weight of a monomer mixture consisting of 60 to 100% by weight of alkyl acrylate, 0 to 40% by weight of a vinyl monomer copolymerizable therewith and 0.1 to 5% by weight of a crosslinking monomer in the presence of 10 to 60 parts by weight of the solids content of a polymer latex prepared by polymerizing 40 to 100% by weight of methyl methacrylate, 0 to 60% by weight of a vinyl monomer copolymerizable therewith and 0.01 to 10% by weight of a crosslinking monomer, to give a 2-layer polymer latex, and then polymerizing 11 to 67 parts by weight of a monomer mixture consisting of 60 to 100% by weight of (meth)acrylate and 0 to 40% by weight of a vinyl monomer copolymerizable therewith in the presence of 100 parts by weight of the solids content of the resulting 2-layer polymer latex.

10. The process for producing the molding thermoplastic polymer particle composition according to claim 6, wherein the aqueous electrolyte solution is an aqueous solution of an inorganic salt.

11. The process for producing the molding thermoplastic polymer particle composition according to claim 5, wherein the emulsion polymer is obtained by graft-polymerizing 10 to 50 parts by weight of a monomer mixture consisting of 10 to 100% by weight of methacrylate, 0 to 90% by weight of an aromatic vinyl monomer, 0 to 25% by weight of a vinyl cyanide monomer, and 0 to 20% by weight of a vinyl monomer copolymerizable therewith in the presence of 50 to 90 parts by weight of the solids content of a rubber latex having a glass transition temperature of 0° C. or less consisting of 50 to 100% by weight of acrylate, 0 to 40% by weight of an aromatic vinyl monomer, 0 to 5% by weight of a crosslinking monomer, and 0 to 10% by weight of a vinyl monomer copolymerizable therewith, such that the total amount of the emulsion polymer becomes 100 parts by weight.

12. The process for producing the molding thermoplastic polymer particle composition according to claim 11, wherein the aqueous electrolyte solution is an aqueous solution of an inorganic salt.

13. The process for producing the molding thermoplastic polymer particle composition according to claim 5, wherein the emulsion polymer is obtained by graft-polymerizing 5 to 20 parts by weight of a monomer mixture consisting of 20 to 80% by weight of at least one monomer selected from acrylate and methacrylate excluding methyl methacrylate, 20 to 80% by weight of methyl methacrylate, and 0 to 20% by weight of a vinyl monomer copolymerizable therewith in the presence of 80 to 95 parts by weight of the solids content of a polymer latex consisting of 50 to 95% by weight of methyl methacrylate, 5 to 50% by weight of methacrylate having a C2 to C8 alkyl group, and 0 to 20% by weight of a vinyl monomer copolymerizable therewith, such that the total amount of the emulsion polymer becomes 100 parts by weight.

14. The process for producing the molding thermoplastic polymer particle composition according to claim 13, wherein the aqueous electrolyte solution is an aqueous solution of an inorganic salt.

15. The process for producing the molding thermoplastic polymer particle composition according to claim 5, wherein the emulsion polymer has a 3-layer structure obtained by polymerizing 40 to 90 parts by weight of a monomer mixture consisting of 60 to 100% by weight of alkyl acrylate, 0 to 40% by weight of a vinyl monomer copolymerizable therewith and 0.1 to 5% by weight of a crosslinking monomer in the presence of 10 to 60 parts by weight of the solids content of a polymer latex prepared by polymerizing 40 to 100% by weight of methyl methacrylate, 0 to 60% by weight of a vinyl monomer copolymerizable therewith and 0.01 to 10% by weight of a crosslinking monomer, to give a 2-layer polymer latex, and then polymerizing 11 to 67 parts by weight of a monomer mixture consisting of 60 to 100% by weight of (meth)acrylate and 0 to 40% by weight of a vinyl monomer copolymerizable therewith in the presence of 100 parts by weight of the solids content of the resulting 2-layer polymer latex.

16. The process for producing the molding thermoplastic polymer particle composition according to claim 5, wherein the aqueous electrolyte solution is an aqueous solution of an inorganic salt.

* * * * *